United States Patent [19]
Frediani

[11] Patent Number: 5,899,409
[45] Date of Patent: May 4, 1999

[54] LARGE DIMENSION AIRCRAFT

[76] Inventor: Aldo Frediani, 49, Via S. Biagio, 56124 Pisa, Italy

[21] Appl. No.: 08/574,364

[22] Filed: Dec. 18, 1995

[30] Foreign Application Priority Data

Dec. 16, 1994 [EP] European Pat. Off. ............. 94120021

[51] Int. Cl.$^6$ ........................................................ B64C 3/00
[52] U.S. Cl. ........................ 244/13; 244/35 R; 244/45 R
[58] Field of Search .................................... 244/13, 35 R, 244/45 R, 91, 46, 47, 37, 38

[56] References Cited

U.S. PATENT DOCUMENTS

| D. 130,649 | 12/1941 | Silverstein | 244/13 |
|---|---|---|---|
| 1,989,291 | 1/1935 | Prewitt | 244/38 |
| 2,066,649 | 1/1937 | Sabins | 244/38 |
| 2,147,968 | 2/1939 | Delanne | 244/13 |
| 2,603,435 | 7/1952 | Metzler | 244/38 |
| 2,768,800 | 10/1956 | Metzler | 244/38 |
| 3,834,654 | 9/1974 | Miranda . | |
| 3,985,317 | 10/1976 | Geraci et al. | 244/13 |
| 4,053,125 | 10/1977 | Ratony | 244/45 R |
| 4,090,681 | 5/1978 | Zimmer | 244/45 R |
| 4,146,199 | 3/1979 | Wenzel | 244/45 R |
| 4,165,058 | 8/1979 | Whitener | 244/45 R |
| 4,390,150 | 6/1983 | Whitener | 244/45 R |
| 4,541,593 | 9/1985 | Cabrol | 244/45 R |
| 4,856,736 | 8/1989 | Adkins et al. | 244/45 R |
| 5,503,352 | 4/1996 | Eger | 244/45 R |

FOREIGN PATENT DOCUMENTS

| 0 619 224 A1 | 10/1994 | European Pat. Off. . | |
| 8905915 U | 5/1989 | Germany . | |
| 8806551 | 9/1988 | WIPO | 244/45 R |

Primary Examiner—Charles T. Jordan
Assistant Examiner—Tien Dinh
Attorney, Agent, or Firm—Browdy and Neimark

[57] ABSTRACT

A large transport aircraft, for more than 400 passengers, with a first wing (3) extending from an intermediate point on the fuselage (1) and a second wing (4) extending from the rear of the fuselage, in proximity to the fin (2). The first wing comprises two halfwings (3a, 3b) swept backward, while the two halfwings (4a, 4b) of the second wing (4) are swept forward. The first and second wings lie on two vertically spaced planes and are connected to one another by respective aerodynamic surfaces (5a, 5b) rigid in their plane in correspondence with the respective halfwings lying on the same side of the fuselage. The first wing (3) can be either at a higher level than the second wing (4) or at a lower level.

19 Claims, 5 Drawing Sheets

LARGE DIMENSION AIRCRAFT

FIELD OF THE INVENTION

The present invention relates to a large transport aircraft. More particularly, the invention relates to a commercial transport aircraft with a passenger capacity greater than 450 seats.

DESCRIPTION OF THE PRIOR ART

Middle-term tendencies indicate a rapid growth in world air traffic with an expected doubling time of 20 years. Aircraft of the class of the Boeing 747 will already be too small at the end of the century, while it will not be possible to increase the frequency of flights very considerably, mostly because of the difficulties regarding air traffic around the largest airports.

The increase in the capacity of aircraft is also indicated by many airlines as the possibility to remain competitive on the international market. Some companies have, furthermore, set out the main requirements for this new class of aircraft. Those requirements regard commercial aspects (improved passenger comfort and the possibility of operating from the already existing airport structures), economic aspects (reduction of fuel consumption per passenger and per km, increase of the operative life of the aircraft and lower investment and maintenance costs), and operative and environmental impact aspects (noise and air pollution). Similar considerations are valid for military transport and the transport of goods.

Currently, the largest aircraft in use is, for heavy transport, the Antonov An225 with a maximum take-off weight (MTOW) of 600000 Kg, wing span of about 88 m and total length of about 84 m, and, for commercial transport, the Boeing 747-400 with MTOW of 395,000 Kg, wing span of about 65 m and total length of about 71 m.

Research currently being carried out for the realization of a commercial aircraft larger than the Boeing 747-400 is based on extending the traditional architecture of current aircraft to satisfy the new capacity needs and the above-mentioned requirements. For example, McDonnel-Douglas (W. J. Orlowski (Douglas Aircraft Co.)), in "A phased approach to introduce new high capacity aircraft," presented to the Royal Aeronautical Society in October 1993, proposes the MD12 transport aircraft. The MD12 is a four-engined aircraft with a fuselage divided into three levels, having the possibility of different configurations which can vary from 480 seats for a distance of 8,100 nm (nautical miles) to 531 seats for distances of 7,500 nm. For the long term, the company proposes a stretched version of the same MD12 to accommodate up to 700 passengers. No revolutionary technology is envisaged, but rather an evolution of technology resulting from improvements in aerodynamics, engines, systems and materials. The parts constructed in composite material are the vertical and horizontal tails in their entirety, the control surfaces of the wings, the fillets, the engines nacelle and the radome. The same criteria for the use of innovative materials are adopted by the other two large world constructors, Boeing and Consortium Airbus.

Boeing (J. B. Hayhurst (Boeing)), in "747 Derivatives," presented to the Royal Aeronautical Society in October 1993, foresees development of a stretched version of the 747-400 of the 500-seat class and a subsequent version of the 747-400 having more than 600 seats, for the meantime referred to as the "747-X New Airplane".

Consortium Airbus (J. Sozdruch (Airbus Industries)), in "Technical challenges for large aircraft", presented to the Royal Aeronautical Society in October 1993, proposes an aircraft having 600 seats with a bilobate fuselage and a double level of fin.

Notwithstanding the fact that these large aircraft have been proposed by constructors as simple extensions of currently existing vehicles, it is the applicant opinion that the adoption of traditional architectures will create strong limitations including those derived from dynamic overstress, static and dynamic aeroelastic phenomena, drastic reduction of structural efficiency, etc. For this reason, the expansion from the current class of 400-500 seats to that of 600 and more seats will involve considerable design problems, especially with regard to the wings.

Important problems in the introduction into service of a large aircraft also regard the structural limitations of airports and the problems of maneuverability on the ground in relation to embarking/disembarking of passengers and goods; in this respect, it is important to keep in mind that, in order for the new aircraft to be considered compatible with the airport areas, the planform dimensions of the new aircraft must not exceed 80×80 m. Other significant limitations regard the vertical fin, the height of which must be such that the aircraft can enter the existing hangars so that the maintenance operations are made possible.

From the combination of the above-mentioned problems, it follows that a large aircraft of the future for the transport of passengers, goods and military equipment and personnel can be hardly obtained as an extension of a class of smaller aircraft, since the process of increasing the dimensions of a traditional aircraft has already reached its practical limit in the class of aircraft currently in service.

Non convenional aircraft configurations were also proposed in the past. U.S. Pat. No. 3,834,654 by Miranda discloses an aircraft wherein the aft wing is low and connected to the fuselage, the rear wing being high and mounted on top of fin. This aircraft is basically a fighter small aircraft with totally different problems of dimensions, stability, controls, etc. than those of a large aircraft; for example, a very large aircraft in which a wing is connected to the top of fin is subjected to static and flutter problems. U.S. Pat. No. 3,942,747 by Volkowitch discloses a diamond-shaped configuration, in which the wings are connected together at their tips. This solution does not make reference to the Prandtl best wing theory.

SUMMARY OF THE INVENTION

The main object of the present invention is to provide a transport aircraft having a load capacity adequate for the above-mentioned air traffic needs of the near future.

Another object of the present invention is to provide an aircraft of the above-mentioned type whose architecture would be such that the resulting wing span is of minor width with respect to that resulting from the expansion of conventional architecture aircraft.

A further object of the present invention is to provide an aircraft of the above-mentioned type with the fin having a total height from the ground shorter than that of conventional aircraft of equal capacity.

Another object of the present invention is to provide an aircraft of the above-mentioned type having an aerodynamic efficiency lower than that of current aircraft while having a shorter total wing span, or equivalently, if the wing span is the same, with an induced drag lower than that of a conventional aircraft.

Another object of the present invention is to provide an aircraft of the above-mentioned type, the configuration of which is such that it eliminates problems related to static and dynamic aeroelastic phenomena.

Yet another object of the present invention is to provide an aircraft of the above-mentioned type wherein the wing structures are built with innovative materials and technology in order to increase the durability and damage tolerance characteristics to obtain an increase of structural efficiency and to cut the costs of production and maintenance.

Another object of the present invention is to provide an aircraft of the above mentioned type which allows the designer to produce a wide family of aircraft using the same philosophy, main design parameters being available in this case unlike the present configurations.

These objects are accomplished by the aircraft according to the present invention, the novel feature of which is that, from two axially spaced positions on its fuselage, two wings extend, sweeping in opposite directions and connected by means of two aerodynamic surfaces which are rigid in their own plane, so keeping the wing spaced from one another. The wing nearer to the front of the fuselage is positioned at a higher or lower level than the wing nearer to the rear of the fuselage. The two configurations so obtained are almost equivalent during cruise, from the aerodynamic point of view; the same is not true in general, as will be shown later on.

BRIEF DESCRIPTION OF THE DRAWINGS

Further characteristics and advantages of the aircraft according to the present invention will be made apparent in the description which follows of one of its possible embodiments, given as an example and not limitative, with reference to the attached drawings in which.

DESCRIPTION OF A PREFERRED EMBODIMENT

Figure 1:
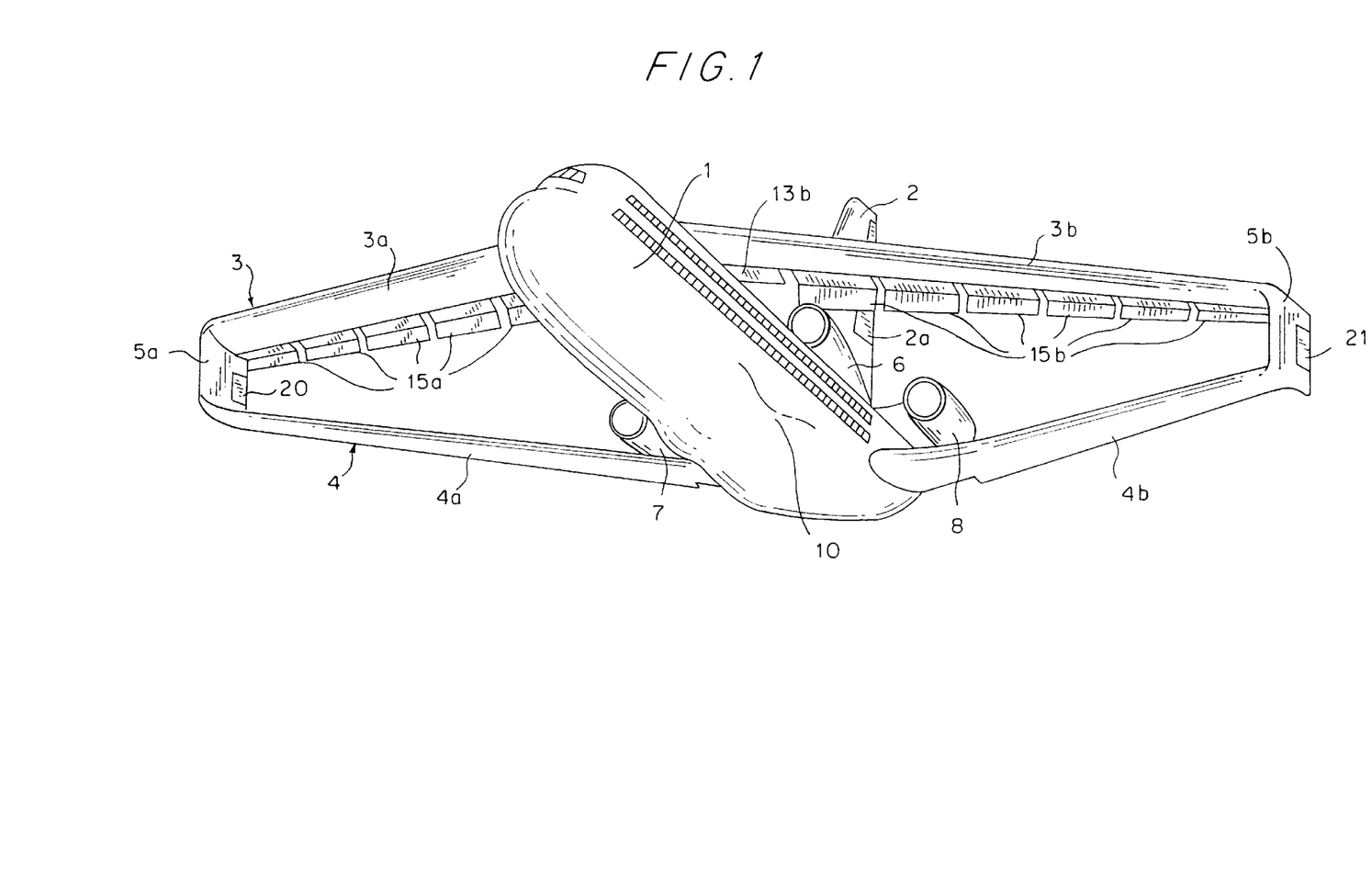
FIG. 1 is a bottom front perspective view of a first embodiment of the aircraft according to the present invention.

With reference to the above-mentioned figures, the fuselage of the aircraft according to the invention is indicated with 1 and the vertical tail plane or fin is indicated with 2 and is provided with a moveable control surface or rudder 2a. From an intermediate point along the longitudinal axis of fuselage 1, a first wing 3 extends formed by two halfwings 3a and 3b swept backward from the fuselage. From the fuselage, in correspondence with its rear portion, a second wing 4 extends formed by two halfwings 4a and 4b sweeping forward, toward the front of the fuselage. Wings 3 and 4 lie on two different planes that are spaced with respect to the longitudinal axis of fuselage 1 and, in the first embodiment of the invention shown in FIG. 1, first wing 3, or the forward wing, is higher than second wing 4, or the rearward wing. Wings 3 and 4 are also connected to one another in correspondence with the tips of their respective halfwings, 3a, 4a and 3b, 4b lying on the same side of the fuselage, by means of two aerodynamic surfaces 5a and 5b which are rigid in their plane. Aerodynamic surfaces 5a and 5b are suited to decrease the induced drag and, also, to transmit internal forces and provide kinematic constraints between the wings themselves. The condition of minimum induced drag was studied by Prandtl more than 70 years ago; the still valid conclusion was that the box configuration is the best wing system. In the aircraft of the present invention, in which swept wings are present, the conclusion by Prandtl remain valid, in view of the Munk theorem on induced drag.

Figure 11:
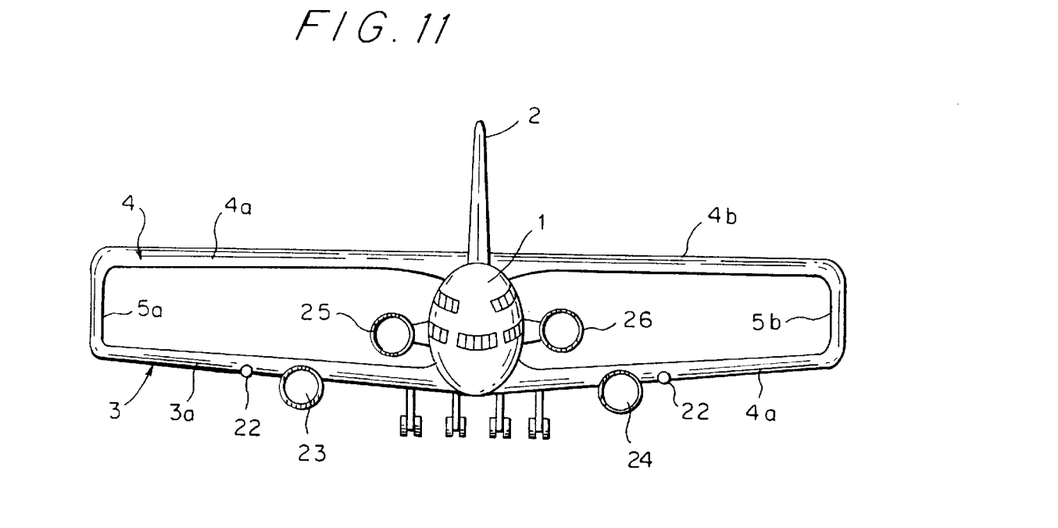
FIG. 11 is a front view of a variation of the aircraft of FIG. 10.

Preferably, aerodynamic surfaces 5a and 5b are provided with moveable control surfaces 20 and 21. The surface of the aft wing is smaller and the lift is higher than the rear wing; therefore the rear wing is less deformed during cruise and, then, is able to absorb a significant part of the lift on the aft wing and produce a kinematic restraint at the tips of this wing. Similarly, the present lifting system allows us to obtain stresses on the two wings independently of the lift distribution generated by them. This is obtained by putting cylindrical hinges 22 on the lower wing according, for example, to FIG. 11. In FIG. 11, two engines 23, 24 are positioned on lower wing and the hinges 22 connect the outer part of wings to the internal part of the same. Another way of controlling the stress levels on the wings is that of preloading the wings, by acting on the two vertical surfaces.

On the rear wall of the fuselage, in correspondence with the fin 2, a first engine 6 is provided for in a central position, while two additional engines 7 and 8 are provided for, next to engine 6, on each side of fuselage 1. According to the capacity of the aircraft and the existing regulations regarding safety criteria during take-off and landing in case of failure of one of the engines, each engine can be substituted by a pair of side-by-side engines. In this way, a three engine configuration (as in the embodiment illustrated), a five engine configuration (two engines in each of positions 7 and 8 and one engine in position 6) and a six engine configuration (two engines in each of positions 6, 7 and 8) can be obtained. In the case of two engines in position 6, said engines are preferably positioned on the two sides of the fin 2 at the same height.

The aircraft also comprises a nose landing gear 11 of a conventional type and main landing gear (indicated schematically with 9 in the figures) preferably positioned inside the fuselage in special nacelles 10 close to the center of gravity of the aircraft. On both sides of wings 3 and 4, moveable surfaces 13a, 13b and 14a, 14b are provided for, the function of which will be described further on, while flaps 15a, 15b are provided along the remaining part of forward wing 3. Further flaps 16a, 16b are provided for on rearward wing 4.

The roots of both wings 3 and 4 are connected to the fuselage and the increase of seats is obtained by adding decks in the vertical direction, thus increasing the gap between the aft and rear wing and then minimizing the induced drag.

Figure 3:
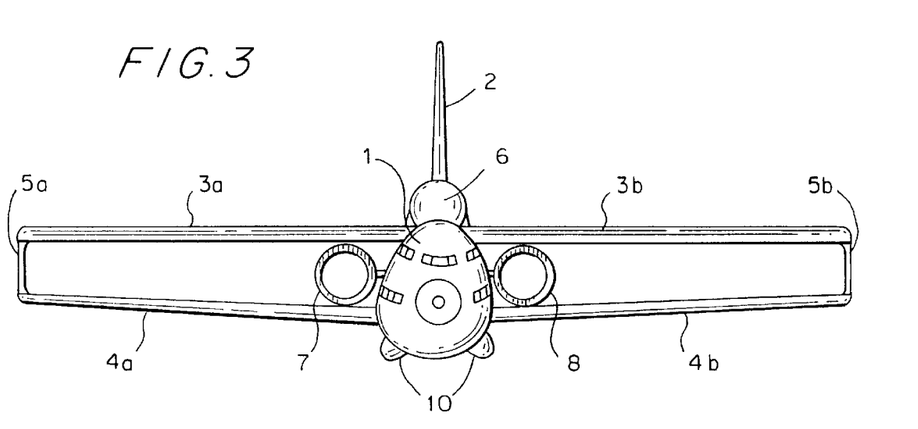
FIG. 3 is a front view of the aircraft of FIG. 1.
Figure 4:
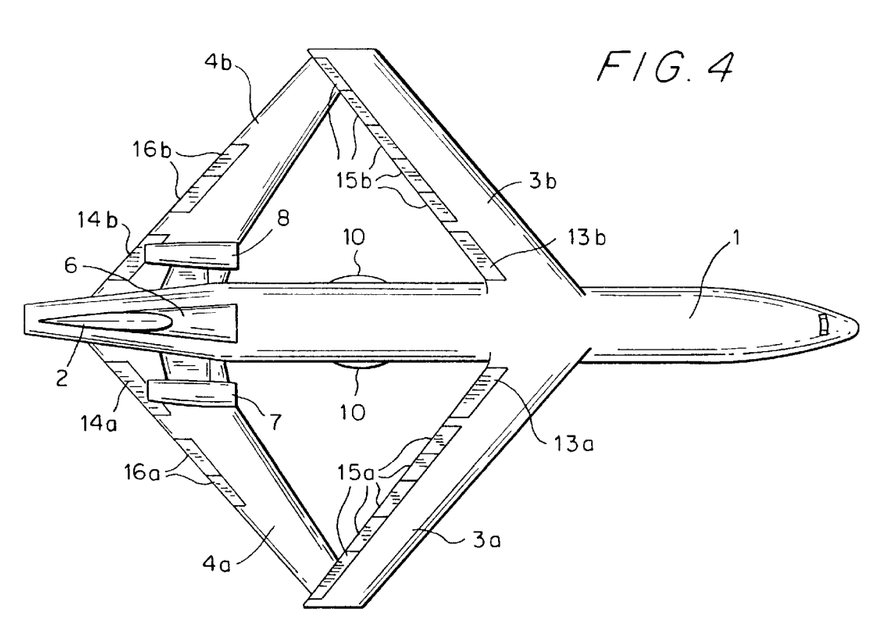
FIG. 4 is a top plan view of the aircraft of FIG. 1.

Both wings 3 and 4 are generally positioned with a dihedral angle. In particular, the forward wing 3 may have a positive, negative or zero dihedral angle in order to obtain a given lateral stability or to avoid any aerodynamic interference on the intakes of engines 7 and 8. Rearward wing 4 has a positive dihedral angle (as illustrated in FIG. 3) not only for reasons of lateral stability, but also to avoid impact of the tips of the wings with the ground during bank landing.

The wing configuration of the aircraft according to the present invention allows for an expansion of the load capacity of fuselage 1, while keeping the wing span within the dimensional limits compatible with airport areas and without decreasing the aerodynamic efficiency compared to aircraft of conventional architectures. Additionally, it allows for the transmission of lift forces to the fuselage through a plurality of load paths. This increases the capacity of the aircraft to tolerate damage to the wing structures also in the presence of casual damage caused by fatigue, projectile holes, etc.

As has already been observed, the forward and rearward wings do not converge at their tips, as in the wing configuration models such as the "diamond" configuration (see, for example, U.S. Pat. No. 4,365, 773), but are spaced by aerodynamic surfaces 5a and 5b. In this way, it is possible to reduce the aerodynamic interference between the wings. This is expecially important in the transonic range, where the presence of possible shock waves on the rear wing can modify significantly the lift disstribution between the wings. The airfoils of the two wings, together with the initial twist, have to be optimized in the transonic range. Furthermore, the possible presence of control surfaces 20 and 21 in elements 5a and 5b allows for the application of pure lateral forces also for the lateral-directional control.

Figure 5:
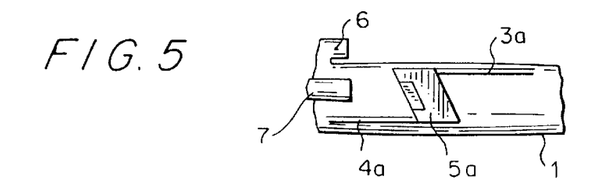
FIGS. 5, 6 and 7 illustrate, schematically, three possibilities for the connection of the tips of the wings by means of rigid aerodynamic surfaces.
Figure 6:
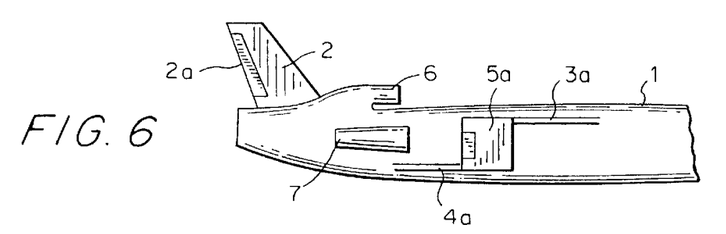
Figure 7:
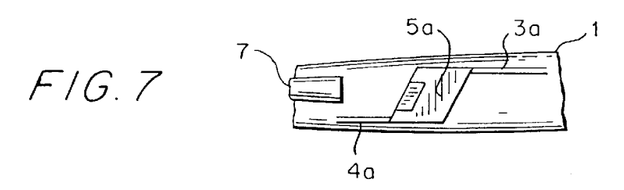
Figure 8A:
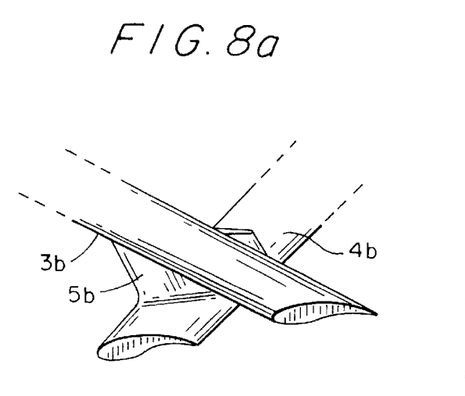
FIGS. 8a, 8b and 9a, 9b show, in a perspective view and front view respectively, two further possible ways of connecting the main planes with said surfaces.
Figure 8B:
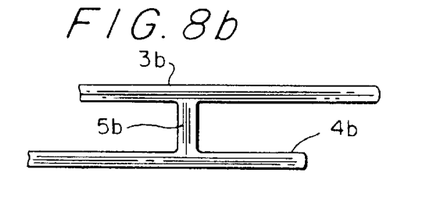
Figure 9A:
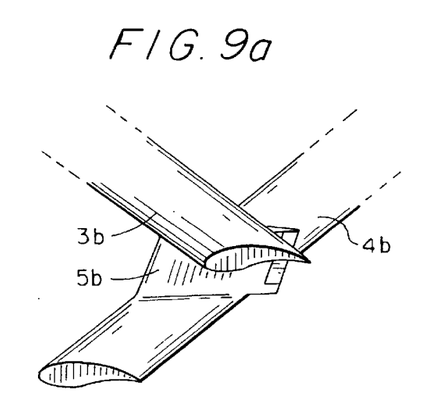
Figure 9B:
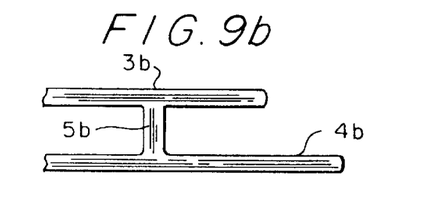

Aerodynamic surfaces 5a and 5b can have different shapes as illustrated in FIGS. 5, 6 and 7 according to whether the tips of the wings are vertically aligned or vertically staggered with respect to one another. In this way, in the design stage, it is possible to axially translate the forward and/or rearward wings while maintaining the same position of the center of gravity.

Surfaces 5a and 5b can also connect the wings in a section that is not exactly the tip, as illustrated in FIGS. 8a, 8b and 9a, 9b. In particular, the two wings can both be connected in two of their intermediate sections, and one wing can be longer than the other. The solutions in FIGS. 8a, 8b and 9a, 9b are introduced to allow a greater variety of design choices and, above all, to optimize the stress distribution and avoiding static and dynamic aeroelastic phenomena. Finally, in this way, it is possible to optimize the position of surfaces 5a and 5b along the span in order to decrease the stress states or vary the vibration frequency of the wings themselves.

The presence of aerodynamic surfaces 5a and 5b makes it possible to preload the wings by introducing self-balanced prestressed status, both in bending and torsion where bending and torsion have opposite signs on the forward and rearward wings. In the wing with the higher load, during flight, a prestressed status able to create compression stresses in the region in tension and tension in the compressed region can be introduced. Therefore it is possible to reduce the maximum operating stresses and the amplitudes of the fatiguing loads under tensile stress, with the advantage of obtaining better characteristics of weight efficiency and fatigue life. This possibility of introducing appropriate residual stresses is not possible in any of the conventional configurations of large aircraft. In the aircraft of the present invention, each prestressed status in the wings can be introduced by "shortening" or "expanding" vertically surfaces 5a and 5b, and a torsion initial status can be obtained by properly arranging the same surfaces with respect to the wings to produce a relative rotation between the wings.

In the aircraft of the present invention, both wings are connected to the fuselage and a very large aircraft is favourable in this respect, because the fusolage is increasing its heigth by adding other decks. A possible connection of a wing to the top of fin (as in U.S. Pat. No. 4,365,773), could give rise to problems of aerodynamic turbolence between the wing itself and the fin and, when present, to engine 6; besides, owing to the flexibility of wing and fin aeroelastic and dynamic phenomena could occur. These disadvantages do not exist with the wing configuration of the aircraft according to the present invention. A further inconvenience of U.S. Pat. No. 4,365,773 lies in the "diamond" configuration of the wings. In fact, based on the beforementioned Prandtl results, the induced drag of a biplane is lower than that of the conventional aircraft with the same lift and wing span, and, when the gap between the two wings of the biplane tends to infinity, the induced drag of biplane is one half of that of a traditional aircraft. This property does not depend on the sweep of the wings. Consequently, the designer can choose to reduce the drag of the biplane with respect to the traditional monoplane when the same wing span is maintained, or to reduce the wing span and obtain the same drag of a monoplane.

The "diamond" configurations do not offer this possible and substantial advantage.

It should, furthermore, be noted that the wing configuration of the aircraft according to the present invention is such that the static aerolelastic problems relative to the forward wing are resolved by the presence of the connection with the rearward wing and vice versa. For example, the torsional divergence of forward swept wing 4 can be solved by the stabilizing effect of backward swept wing 3, connected to the former by means of surfaces 5a and 5b. Furthermore, the efficiency of lateral control of the back swept wing, characterized by a reversal, is solved in the present case by positioning the lateral-controls 16a and 16b on the forward swept wing. In this way the efficiency is high and then the aileron surface can be reduced and the control equipment becomes simpler and lighter.

The particular wing configuration of the aircraft according to the present invention allows for a longitudinal control with pure pitch torque obtained by rotating surfaces 13a, 13b set on the forward wing on one side and surfaces 14a, 14b set on the rearward wing, on the opposite side. The surfaces are relatively small, given the large distance between them. The pure torque command can also be associated with a lift; by partializing the front or rear moveable surfaces, the lift associated with the torque can be positive or negative. A pure torque command is not possible with any conventional aircraft.

Flaps 15a and 15b are located on the back swept wing and extend along a large part of the wing span; in that way, with the flaps extended, it is possible to obtain a distribution of lift more similar to an elliptical shape, and, therefore, of minimum induced drag during take-off and landing, as opposed to conventional aircraft. Said flaps can have a chord variable along span, in relation to the tapering of the wing; this possibility is particularly useful at low speeds and can be obtained with flaps smaller than those of conventional aircraft. The main landing gear 9 is located inside the fuselage; this makes the structure of the fuselage more complex and large but, a volume is recovered. If landing gear 9 were located on rear wing 4, the most limiting design condition of the wings would be that of the rotation of the aircraft main landing gear on the runaway, with consequent less efficiency in cruise. Additionally, during landing, the tangential and centrifuge accelerations which the pilot and the passengers in the front of the fuselage are subjected to would be considerable due to the distance of their masses from the main landing gear.

It should be noted that when the rear wing (just as the front wing) is free from concentrated loads produced by landing gears and engines, non metallic materials can be used, such as composite materials. Glare laminated materials and the like, or combinations of the two materials obtained by means of layers of glass fibers combined with layers of composite and Glare, with a reduction of weight as well as of costs compared to conventional configurations. The use of Glare or similar materials as the external covering of the wings also makes it possible to resolve the problems resulting from impacts and assures protection from lightening as well as a high quality surface finish. This aspect, along with that of a much smaller aerodynamic chord than current aircraft, allows for use of special profiles, called laminar airfoils, which make it possible to maintain a laminar boundary layer, for a considerable portion of the chord, contrary to conventional aircraft.

Finally, the fuselage can be composed of three or more decks; in the case of commercial airliner the lowest level is reserved essentially as a space for luggage and goods, whereas the upper levels are assigned to the transport of passengers. The configuration according to the present invention allows for an increase of the volumes available, with every other dimension of the fuselage remaining the same, as a consequence of the lesser volume occupied by the crossing of the fuselage by the wings.

Figure 10:
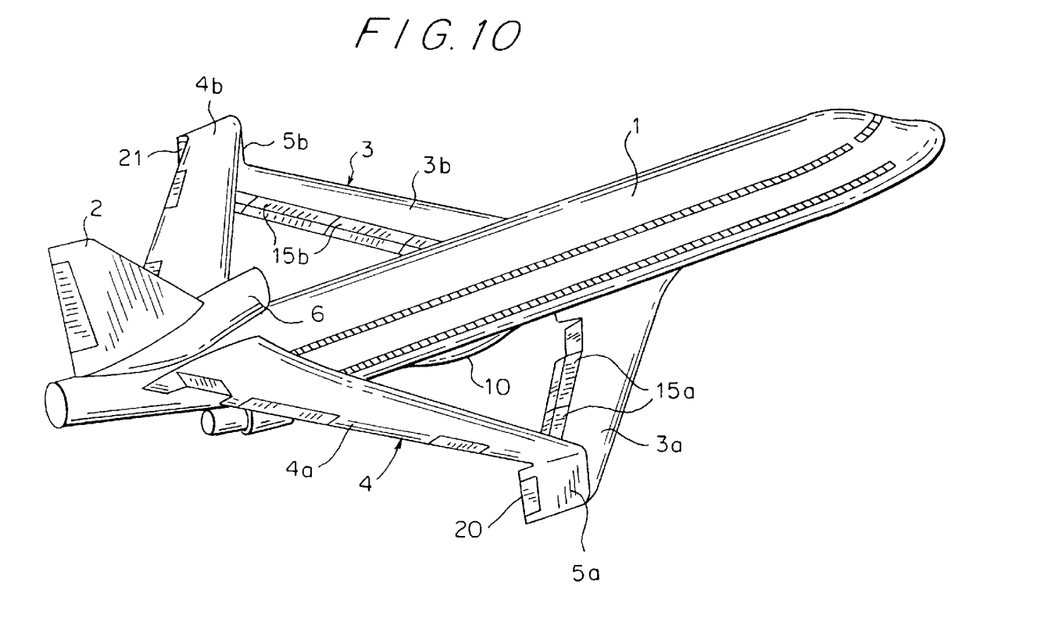
FIG. 10 is a side perspective view of a second embodiment of the aircraft according to the present invention.

A solution with the same gap between the wings, in which the forward wing is low and the rearward wing is high, but anyway bound to the fuselage, such as the embodiments shown in FIGS. 10 and 11, is equivalent to the above described embodiment with a low rearward wing and a high forward wing from an aerodynamic (except a different ground effect) and structural standpoint and, therefore, the two configurations fall within the spirit and scope of the present invention.

FIG. 11 also shows a further possible engine arrangement comprising four engines, two of which are supported by the forward wing 3 near to hinges 22, and the other two engines 25, 26 are placed on both sides of the fuselage below the rearward wing 4.

Figure 2:
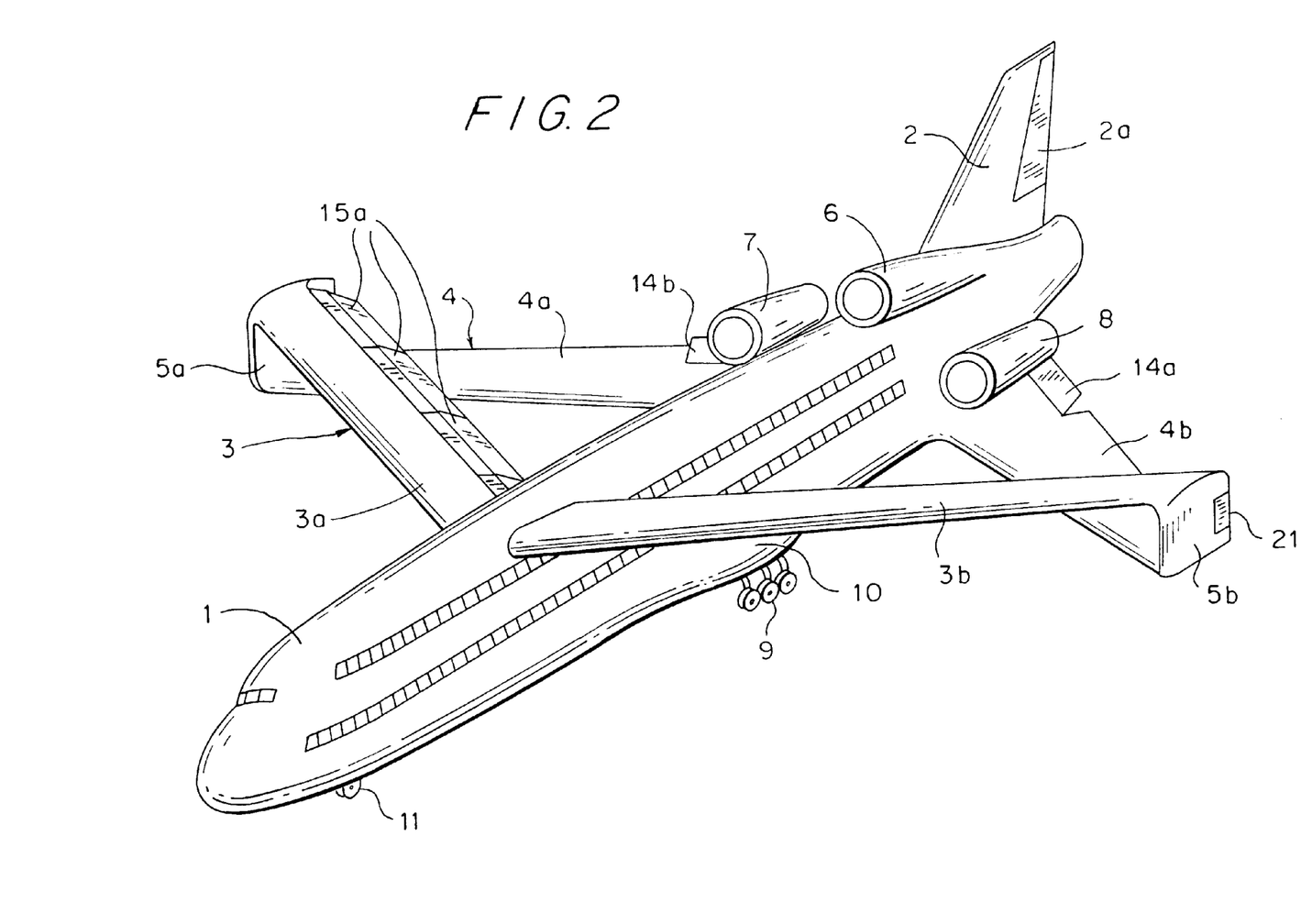
FIG. 2 is a top front perspective view of the aircraft of FIG. 1.

Since many configurations are available to cover a large range of dimensions, both the high and low forward wing arrangements can be used. The configuration with forward wing in the lower position (FIGS. 10, 11) may be preferred owing to lower interference with the nacelles, the presence of a positive aerodynamic ground effect, etc. The configuration with forward wing in the high position (FIGS. 1, 2) may be preferred to prevent, for certain sizes of aircrafts, the forward wing from putting the rearward wing in the slip stream during flight with a high angle of incidence, such as during take-off and landing, which would make the control of the aircraft difficult. This solution would be also preferred when it is necessary to limit the height of the landing gear, since the flaps on the high wing do not interfere with the ground.

I claim:

1. A large transport aircraft having a maximum take-off weight greater than 400,000 kg, comprising a fuselage (1) having multiple passenger decks with a fin (2), a first wing (3) extending from an intermediate point on said fuselage (1) and a second wing (4) extending from the rear of said fuselage in proximity to said fin (2), an entire length of each of said first wing and second wing respectively lying on two vertically spaced apart and substantially parallel planes so that each of two end tips of said first wing respectively lie vertically spaced apart from and overlapping each of two end tips of said second wing, said first wing (3) comprising a first set of two halfwings (3a,3b) each fixed to an upper portion of the fuselage and sweeping towards the rear of the fuselage, said second wing (4) comprising a second set of two halfwings (4a, 4b) each fixed to a lower portion of the fuselage and sweeping towards the front of the fuselage, each of two rigid aerodynamic surfaces respectively connecting said first wing to said second wing on different planes between said two vertically spaced apart and substantially parallel planes.

2. Aircraft according to claim 1, wherein said first wing (3) is situated at a higher level than said second wing (4).

3. Aircraft according to claim 1, wherein said first wing (3) is situated at a lower level than said second wing (4).

4. Aircraft according to claim 1, wherein said two rigid aerodynamic surfaces (5a, 5b) respectively connect the two end tips of the first wings to the two end tips of the second wings.

5. Aircraft according to claim 1, wherein said two rigid aerodynamic surfaces (5a, 5b) are respectively connected to an intermediate point of at least one of said halfwings.

6. Aircraft according to claim 1, wherein said two rigid aerodynamic surfaces (5a, 5b) have moveable control surfaces (20, 21).

7. Aircraft according to claim 1, wherein said second wing (4) has a positive dihedral angle.

8. Aircraft according to claim 1, wherein said first wing (3) has a positive dihedral angle.

9. Aircraft according to claim 1, wherein a main landing gear is housed in the fuselage near to the center of gravity of the aircraft.

10. Aircraft according to claim 1, wherein the tips of the halfwings (3a, 4a and 3b, 4b) connected by said aerodynamic surfaces (5a, 5b) are vertically aligned or staggered with respect to one another.

11. Aircraft according to claim 5, wherein one of said first or second wings is longer than the other to which it is connected at an intermediate point by means of the respective twin rigid aerodynamic surfaces.

12. Aircraft according to claim 1, wherein said first and second wings (3, 4) are preloaded with self-balancing pre-stressed status of opposite signs and of a flexural and torsional type by means of said two rigid aerodynamic surfaces (5a, 5b).

13. Aircraft according to claim 1, wherein said halfwings (3a, 3b) of said first wing (3) comprises an axial hinge (22) at an intermediate point thereof.

14. Aircraft according to claim 1, wherein the surface of said first wing (3) is lower than that of said second wing (4).

15. Aircraft according to claim 1, wherein, on said second wing (4), moveable surfaces (16a, 16b) are positioned for lateral-directional controls.

16. Aircraft according to claim 1, wherein wing flaps (15a, 15b) are provided for on a large part of said first wing (3), so that the distribution of lift with the flaps extended approximates an elliptical form.

17. Aircraft according to claim 1, wherein the wings are formed in composite material, glare laminas and/or a combination of the two.

18. Aircraft according to claim 1, wherein, on said first wing (3) and said second wing (4), on each side of the fuselage and in proximity to it, moveable control surfaces (13a, 13b, 14a, 14b) are provided.

19. A large transport aircraft having maximum take-off weight greater than 400,000 kg, comprising a fuselage (1) having multiple passenger decks with a fin (2), a first wing (3) extending from an intermediate point on said fuselage (1) and a second wing (4) extending from the rear of said fuselage in proximity to said fin (2), an entire length of each of said first wing and second wing respectively lying on two vertically spaced apart and substantially parallel planes so that each of two end tips of said first wing respectively lie vertically spaced apart from and overlapping each of two end tips of said second wing, said first wing (3) comprising a first set of two halfwings (3a,3b) each fixed to an upper portion of the fuselage and sweeping towards the rear of the fuselage, said second wing (4) comprising a second set of two halfwings (4a, 4b) each fixed to a lower portion of the fuselage sweeping towards the front of the fuselage, each of two rigid aerodynamic surfaces respectively connecting said first wing to said second wing on different planes between said two vertically spaced apart and substantially parallel planes, wherein said first wing (3) is situated at a higher level than said second wing (4).

\* \* \* \* \*